(12) United States Patent
Sakurai et al.

(10) Patent No.: US 10,918,977 B2
(45) Date of Patent: Feb. 16, 2021

(54) SUCTION NOZZLE AND FLUID RECOVERY APPARATUS

(71) Applicant: NITTO KOHKI CO., LTD., Tokyo (JP)

(72) Inventors: Hiroto Sakurai, Tokyo (JP); Hiroshi Nishitsuji, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 338 days.

(21) Appl. No.: 15/956,022

(22) Filed: Apr. 18, 2018

(65) Prior Publication Data

US 2018/0229159 A1 Aug. 16, 2018

Related U.S. Application Data

(63) Continuation of application No. PCT/JP2016/081008, filed on Oct. 19, 2016.

(30) Foreign Application Priority Data

Oct. 20, 2015 (JP) ................................. 2015-206042

(51) Int. Cl.
*B23Q 11/00* (2006.01)
*B01D 21/24* (2006.01)
*B01D 29/15* (2006.01)
*B01D 35/02* (2006.01)
*B01D 29/56* (2006.01)
(Continued)

(52) U.S. Cl.
CPC ......... *B01D 29/15* (2013.01); *B01D 21/0018* (2013.01); *B01D 21/2472* (2013.01); *B01D 29/0077* (2013.01); *B01D 29/56* (2013.01); *B01D 35/02* (2013.01); *B01D 35/04* (2013.01); *B23Q 11/00* (2013.01); *F17D 3/16* (2013.01)

(58) Field of Classification Search
CPC ........................ B23Q 11/0042; B23Q 11/1069
See application file for complete search history.

(56) References Cited

FOREIGN PATENT DOCUMENTS

| CN | 1919467 | | 2/2007 |
|---|---|---|---|
| CN | 1919467 A | * | 2/2007 |

(Continued)

OTHER PUBLICATIONS

CN1919467A—EPO Machine Translation (Year: 2020).*
(Continued)

*Primary Examiner* — Patrick Orme
(74) *Attorney, Agent, or Firm* — Burris Law, PLLC

(57) ABSTRACT

The present disclosure is directed toward a suction nozzle operable to remove solid contaminants from a fluid without causing a substantial increase in fluid resistance. The suction nozzle has a vertical flow path, a contaminant precipitation recess opened upward under the vertical flow path, and a lateral flow path extending laterally from the vertical flow path at a position above the contaminant precipitation recess. The fluid sucked from a suction opening in the lower surface is led to the vertical flow path through the lateral flow path and flows upward through the vertical flow path to reach a connection port. With fluid flowing through the vertical flow path, solid contaminants contained in the fluid settle down by gravity and precipitate in the contaminant precipitation recess and are separated and removed from the fluid.

18 Claims, 3 Drawing Sheets

(51) Int. Cl.
  *F17D 3/16*  (2006.01)
  *B01D 21/00*  (2006.01)
  *B01D 29/00*  (2006.01)
  *B01D 35/04*  (2006.01)

(56) References Cited

FOREIGN PATENT DOCUMENTS

| JP | 50111774 U | * | 9/1975 |
|----|------------|---|--------|
| JP | 1975111774 |   | 9/1975 |
| JP | S5236634 A | * | 3/1977 |
| JP | 1996196826 |   | 8/1996 |
| JP | 1999128621 |   | 5/1999 |
| JP | 2000233342 |   | 8/2000 |
| JP | 2009034610 |   | 2/2009 |

OTHER PUBLICATIONS

JPS50111774U (EPO Machine Translation) (Year: 2020).*
International Search Report for International Application PCT/JP2016/081008, dated Jan. 24, 2017.

* cited by examiner

SUCTION NOZZLE AND FLUID RECOVERY APPARATUS

CROSS-REFERENCE TO RELATED APPLICATIONS

This application is a continuation of International Application No. PCT/JP2016/081008, filed on Oct. 19, 2016, which claims priority to and the benefit of JP 2015206042 filed on Oct. 20, 2015. The disclosures of the above applications are incorporated herein by reference.

FIELD

The present disclosure relates to a suction nozzle for sucking a fluid while separating solid contaminants from the fluid and also relates to a fluid recovery apparatus having the suction nozzle.

BACKGROUND

The statements in this section merely provide background information related to the present disclosure and may not constitute prior art.

Conventional fluid recovery apparatus recovering fluids that may contain solid contaminants, such as used cutting fluid and used lubricating fluid, are configured as follows. A suction nozzle also known as a strainer is submerged in a used fluid collected in a container, and the fluid is sucked by a suction pump through the suction nozzle so as to be transferred and recovered into a predetermined another container (Japanese Patent Application Publication No. H08-196826). The recovered fluid is often reused after solid contaminants have been removed therefrom if necessary.

The suction nozzle used in such fluid recovery apparatus has a connection port connected to the pump and a suction opening opened to a great extent at a side of the suction nozzle that faces down when the suction nozzle is disposed in the container. Cited Literature 2 (Japanese Patent Application Publication No. H11-128621), for example, discloses a suction nozzle (strainer) used in an apparatus for recovering and recirculating lubricating fluid in a vehicle. The suction nozzle has a net-shaped metal member disposed at the suction opening as a simple filter to remove relatively large-sized solid contaminants.

Fluid recovery apparatus having such a suction nozzle are also often used to recover cutting fluid that has been used at cutting work sites in factories.

SUMMARY

The above-described fluids, e.g. used cutting fluid and used lubricating fluid, contain solid contaminants such as metallic powder. Although large-sized contaminants are separated and removed by the net-shaped metal member disposed in the suction nozzle, fine solid contaminants are sucked by the suction pump in the state of being contained in the fluid. Therefore, if a mechanical pump having a diaphragm type or piston type movable part is used as the suction pump, the solid contaminants contained in the sucked fluid may damage the movable part of the pump or may enter a gap in the movable part, causing degradation of the performance of the pump or a failure in the pump, depending on the situation.

Cutting fluid that has been used in a factory, particularly, contains a large amount of metallic powder. Therefore, it is difficult to use the above-described mechanical pump as a suction pump for sucking such a fluid, and a pump utilizing an ejector effect, which has no movable part, is usually used for that purpose. The ejector pump, however, generates a loud noise and, moreover, consumes a large amount of compressed air and is therefore disadvantageous in terms of energy efficiency.

The inventors have discovered that in view of the solid contaminants in a fluid to be recovered, it may be conceivable to dispose in the suction nozzle a fine-mesh filter capable of removing smaller-sized contaminants. However, installation of a too fine-mesh filter causes an increase in fluid resistance during suction, which may result in the use of a high-output pump.

Accordingly, the present disclosure provides a suction nozzle capable of improving the performance of removing solid contaminants from a fluid without causing a substantial increase in the fluid resistance and to provide a fluid recovery apparatus having such a suction nozzle.

The present disclosure provides a suction nozzle to be connected to a suction pump to suck a fluid while separating solid contaminants from the fluid. The suction nozzle includes the following elements: a connection port configured to be fluidly connected to the suction pump; a suction opening for sucking the fluid; a vertical flow path configured to extend substantially in a vertical direction when the suction nozzle is placed in a position to perform suction; a contaminant precipitation recess provided under the vertical flow path in alignment with a longitudinal axis of the vertical flow path, the contaminant precipitation recess being opened upward to communicate with the vertical flow path; and a lateral flow path extending laterally from the vertical flow path at a position above the contaminant precipitation recess. The suction nozzle is configured such that the fluid sucked from the suction opening is led to the vertical flow path through the lateral flow path and flows upward through the vertical flow path to reach the connection port.

In the suction nozzle, the upwardly opened contaminant precipitation recess is provided under the vertical flow path, and when a fluid containing solid contaminants flows upward through the vertical flow path, the solid contaminants are allowed to settle downward by gravity and precipitated in the contaminant precipitation recess, thereby enabling separation of the solid contaminants from the sucked fluid. Thus, it becomes possible to reduce the content of solid contaminants in the fluid sucked through the suction nozzle and hence possible to use a diaphragm pump or other mechanical pump, which consumes a low amount of energy, and not a conventional ejector pump, which consumes a large amount of energy. Further, the solid contaminant separating structure of the suction nozzle is capable of reducing the increase in fluid resistance as compared to the use of a filter performing a comparable solid contaminant separating function. Accordingly, suction can be performed efficiently, and it is possible to use a low-output pump.

In one form, the vertical flow path may have a cross section larger than that of the connection port.

With the above-described structure, the flow velocity of the fluid in the vertical flow path becomes slow; therefore, it is possible to precipitate the solid contaminants even more efficiently.

In one form, the lateral flow path may have a cross section larger than that of the connection port.

With the above-described structure, the flow velocity of the fluid flowing into the vertical flow path becomes slow; therefore, it is possible to suppress the generation of turbulence in the vertical flow path.

In another form, the suction nozzle may include the following elements: a hollow nozzle body formed with the suction opening and the connection port; a flow path member having the vertical flow path and the lateral flow path and disposed in the nozzle body in a state where the vertical flow path is fluidly connected to the connection port; and a filter disposed in the nozzle body between the suction opening and the lateral flow path in the flow path member. The nozzle body, the flow path member, and the filter may be detachably attached to each other.

Provision of the filter upstream of the lateral flow path enables relatively large solid contaminants to be previously separated and removed by the filter, so that in the vertical flow path only relatively small solid contaminants are separated. Therefore, it is possible to increase the length of time until the contaminant precipitation recess is filled up with solid contaminants and hence possible to extend maintenance intervals. In addition, separation and removal of solid contaminants with a plurality of devices enables the suction nozzle to have high separation-removal performance. In addition, because the nozzle body, the flow path member, and the filter are detachable from each other, each member can be cleaned and replaced easily.

In one form, the arrangement may be as follows. An annular space is formed between an inner peripheral surface of the nozzle body and an outer peripheral surface of the flow path member, and the filter has an annular shape and is disposed in the annular space.

In yet another form, the arrangement may be as follows. The filter has a lower surface facing the suction opening and a side surface extending upward from the peripheral edge of the lower surface, and the suction nozzle further includes an annular gap between the side surface and the inner peripheral surface of the nozzle body, the annular gap communicating with the suction opening.

With the above-described arrangement, the surface area of the filter contacted with the sucked fluid increases, and it is therefore possible to reduce the fluid resistance when the fluid passes through the filter. In addition, because places where the fluid enters the filter are dispersed, the filter is less likely to be clogged with solid contaminants and hence usable for a long period of time.

In one form, the suction nozzle may further include a plate-shaped member detachably attached to the lower surface of the flow path member. The flow path member may be detachably attached to the nozzle body by threaded engagement, and the plate-shaped member may retain the filter in the nozzle body by supporting the filter from below.

With the above-described arrangement, it is easy to disassemble the nozzle body, the flow path member, and the filter from each other.

Specifically, the arrangement may be as follows. The plate-shaped member has a multiplicity of circular holes and is disposed to cover the suction opening, so that the fluid sucked from the suction opening passes through the circular holes before reaching the filter.

The plate-shaped member makes it possible to inhibit relatively large solid contaminants from being sucked into the nozzle body.

In one form, the arrangement may be as follows. The suction nozzle includes a plurality of the lateral flow paths spaced from each other in the circumferential direction of the vertical flow path. The lateral flow paths extend radially with respect to the vertical flow path.

In addition, the present disclosure provides a fluid recovery apparatus including the following elements: any one of the above-described suction nozzles; and a suction pump fluidly connected to the connection port of the suction nozzle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
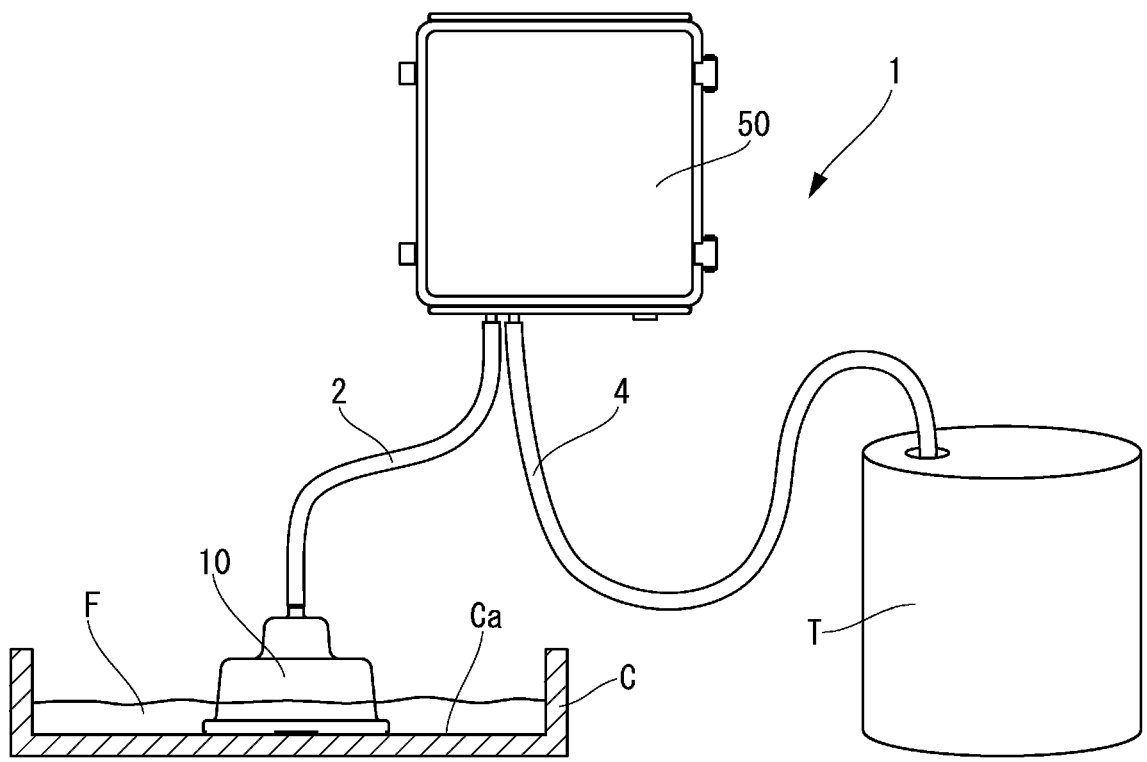
FIG. 1 is a schematic view showing the way in which a fluid recovery apparatus of the present disclosure is used.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A fluid recovery apparatus 1 according to one form of the present disclosure comprises, as shown in FIG. 1, a suction nozzle 10 placed in a container C where a fluid F to be recovered is collected, and a suction unit 50 fluidly connected to the suction nozzle 10 through a suction tube 2. A discharge tube 4 is also connected to the suction unit 50 and disposed to extend into a recovery tank T storing the recovered fluid. To recover a fluid F, e.g. used cutting fluid, which has been collected in the container C, the suction nozzle 10 is placed in the container C so as to be submerged in the fluid F at least partially, and the fluid F is sucked by the suction unit 50 through the suction nozzle 10. Further, the sucked fluid is discharged into the recovery tank T through the discharge tube 4. The suction nozzle 10 is configured to separate and remove solid contaminants, such as metallic powder contained in the used cutting fluid, as will be described later. Therefore, the content of solid contaminants in the fluid is reduced to a considerable extent by passing through the suction nozzle 10. Accordingly, the fluid sucked into the suction unit 50 contains substantially no solid contaminants. The fluid recovered into the recovery tank T is usually reused after being further subjected to removal of impurities or the like if desired, although the solid contaminant content has already been reduced.

Figure 2:
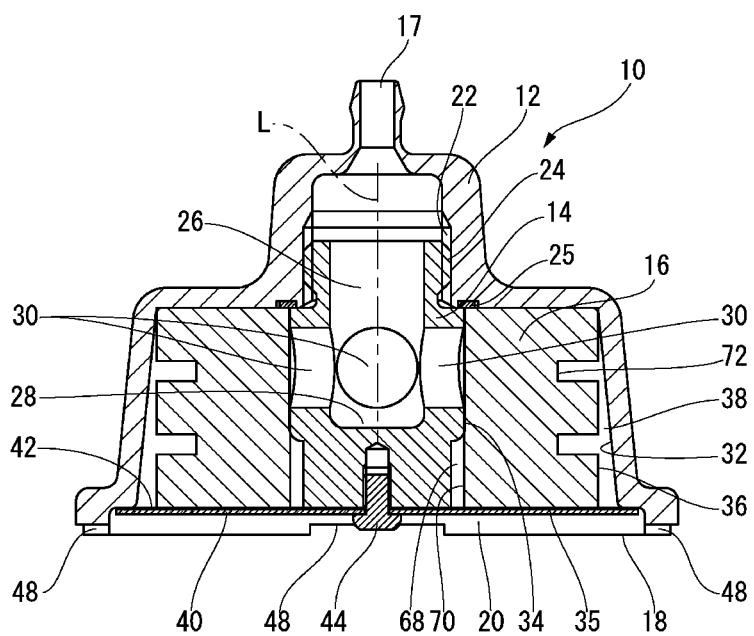
FIG. 2 is a sectional side view of a suction nozzle of the present disclosure.

The suction nozzle 10 has, as shown in FIG. 2, a hollow nozzle body 12, and a flow path member 14 and a filtration filter 16 which are disposed in the nozzle body 12. The nozzle body 12 has a connection port 17 fluidly connected to the suction unit 50. The nozzle body 12 further has a supporting lower surface 18 contacting a bottom surface Ca of the container C, and a suction opening 20 opened in the supporting lower surface 18. The nozzle body 12 has an internally threaded portion 22 formed therein. The flow path member 14 is detachably attached to the nozzle body 12 by threadedly engaging an externally threaded portion 24 with the internally threaded portion 22 of the nozzle body 12. The nozzle body 12 and the flow path member 14 are sealingly engaged with each other through a seal member 25 to inhibit a fluid leak through a gap between the externally threaded portion 24 and the internally threaded portion 22. The flow path member 14 has a vertical flow path 26 formed to extend in a direction perpendicular to the supporting lower surface 18, i.e. in a vertical direction when the suction nozzle 10 is put into the container C and placed in a position to perform suction. The flow path member 14 further has a contaminant precipitation recess 28 provided under the vertical flow path 26, and a lateral flow path 30 extending laterally from the vertical flow path 26 at a position above the contaminant precipitation recess 28. The contaminant precipitation recess 28 is provided under the vertical flow path 26 in alignment with a longitudinal axis L of the vertical flow path 26 and formed to be opened upward toward the vertical flow path 26. The contaminant precipitation recess 28 is, in this variation, a circular recess having the same diameter as that of the vertical flow path 26. There are provided four lateral flow paths 30 circumferentially spaced from each other at the same height. The lateral flow paths 30 are formed to extend radially with respect to the vertical flow path 26. There is formed an annular space between an inner peripheral surface 32 of the nozzle body 12 and an outer peripheral surface 34 of the flow path member 14, and the filtration filter 16, which has an annular shape, is disposed in the annular space. The filtration filter 16 has an outer peripheral surface 36 extending upward from a lower surface 35 facing the suction opening 20 of the nozzle body 12, so that an annular gap 38 is formed between the outer peripheral surface 36 of the filtration filter 16 and the inner peripheral surface 32 of the nozzle body 12, the annular gap 38 communicating with the suction opening 20.

Figure 3:
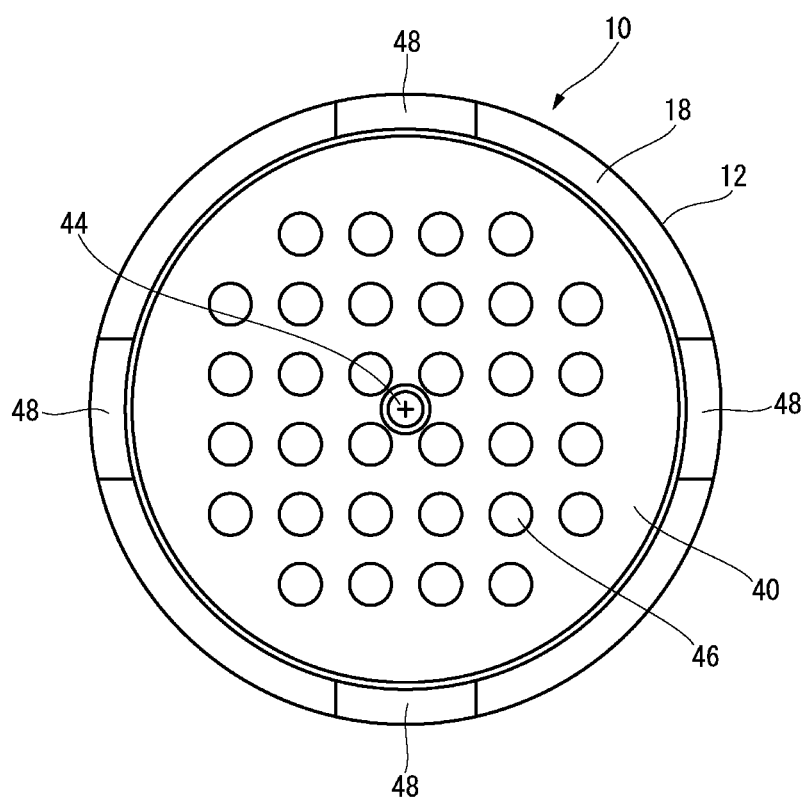
FIG. 3 is a bottom view of the suction nozzle shown in FIG. 2.

The suction nozzle 10 further has a perforated metal plate 40 and a metal mesh 42 which are disposed to cover the suction opening 20. The perforated metal plate 40 and the metal mesh 42 are detachably attached to the flow path member 14 with a screw 44. The perforated metal plate 40 is, as shown in FIG. 3, a disk-shaped metallic member perforated with a multiplicity of circular holes 46. The metal mesh 42 is a member formed by weaving a metal into a sheet shape having substantially the same diameter as the perforated metal plate 40. The perforated metal plate 40 retains the filtration filter 16 and the metal mesh 42 in the nozzle body 12 and also operates as a first-stage filter for solid contaminants. The metal mesh 42, which is retained over the perforated metal plate 40, may operate as a second-stage filter for solid contaminants.

The nozzle body 12 has four grooves 48 formed in the supporting lower surface 18. When the suction nozzle 10 is placed in the container C, the grooves 48 form gaps between the suction nozzle 10 and the bottom surface Ca of the container C.

Figure 4:
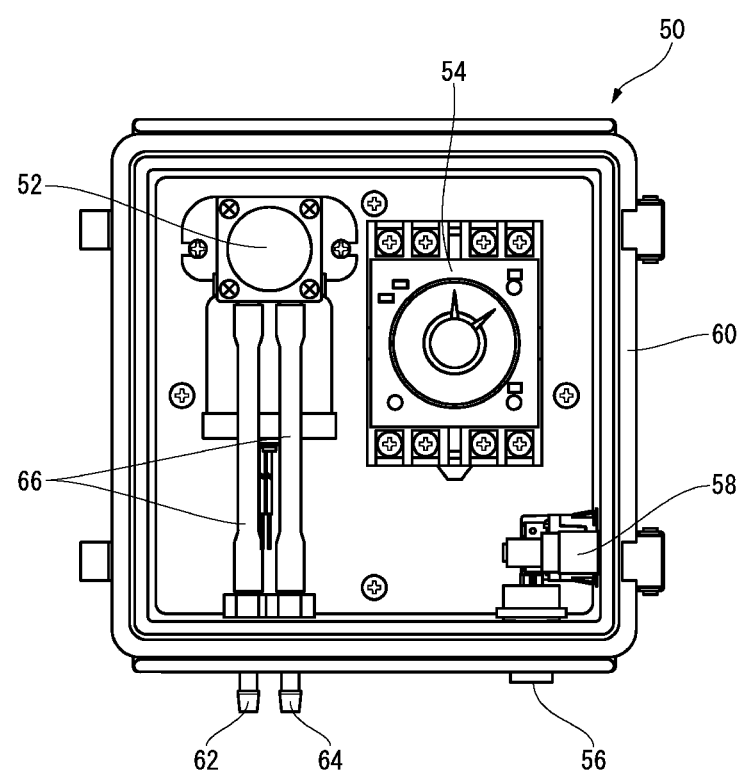
FIG. 4 is an illustration of the structure of a suction unit of the fluid recovery apparatus shown in FIG. 1.

The suction unit 50 has, as shown in FIG. 4, a suction pump 52, a timer 54, a power supply connector 56, a power supply switch 58, and a water-proof casing 60 accommodating these devices. It should be noted that although illustration of electric wiring between the devices is omitted in FIG. 4, the devices are properly electrically connected through wiring in the water-proof casing 60. The water-proof casing 60 is further equipped with a suction-side plug 62 fluidly connected to the connection port 17 of the suction nozzle 10 through the suction tube 2, and a discharge-side plug 64 to which the discharge tube 4 is connected. The suction pump 52 is connected to the suction-side plug 62 and the discharge-side plug 64 in the water-proof casing 60 through tubes 66, respectively. The timer 54 allows setting of a drive start time and drive stop time of the suction pump 52, thereby enabling the suction pump 52 to be driven to recover the fluid only for a predetermined period of time from the turning on of the power supply. In this form, a diaphragm pump is used as the suction pump 52.

When the power supply of the suction unit 50 is turned on to start driving the suction pump 52 with the suction nozzle 10 placed in the container C where the fluid F has been collected, as shown in FIG. 1, the fluid F starts to be sucked through the suction nozzle 10. The fluid F is sucked into the nozzle body 12 through the grooves 48, which are provided in the supporting lower surface 18 of the nozzle body 12, to reach the suction opening 20. Further, the fluid F passes through the perforated metal plate 40 and the metal mesh 42. At this time, solid contaminants such as metallic pieces larger than several millimeters are removed by the perforated metal plate 40, and solid contaminants larger than several hundreds of micrometers are removed by the metal mesh 42. Next, the sucked fluid F passes through the filtration filter 16. At this time, the fluid F enters the filtration filter 16 not only from the lower surface 35 of the filtration filter 16 but also from the outer peripheral surface 36 of the filtration filter 16 through the annular gap 38, which is formed between the outer peripheral surface 36 and the inner peripheral surface 32 of the nozzle body 12, and from an inner peripheral surface 70 of the filtration filter 16 through a gap 68 formed between the inner peripheral surface 70 and the outer peripheral surface 34 of the flow path member 14. Thus, the suction nozzle 10 is configured so that the fluid enters the filtration filter 16 from various portions thereof, thereby reducing the fluid resistance when the fluid passes through the filtration filter 16, and also inhibiting the filtration filter 16 from being locally clogged easily. In addition, the filtration filter 16 has two circumferentially extending grooves 72 formed in the outer peripheral surface 36, thereby further increasing the surface area. The filtration filter 16 further removes solid contaminants larger than several tens of micrometers.

The fluid that has passed through the filters, i.e. the perforated metal plate 40, the metal mesh 42, and the filtration filter 16, flows toward the vertical flow path 26 from each of the four lateral flow paths 30 in the flow path member 14. The fluid flowing into the vertical flow path 26 changes the flow direction to upward. The lateral flow paths 30 and the vertical flow path 26 are larger in cross section than the connection port 17. Accordingly, the flow velocity of the fluid in the lateral flow paths 30 and the vertical flow path 26 becomes relatively slow. While the fluid is flowing through the vertical flow path 26, solid contaminants contained in the fluid settle down by gravity and precipitate in the contaminant precipitation recess 28, which is located under the vertical flow path 26.

Thus, in the suction nozzle 10, the fluid is passed through the filters, i.e. the perforated metal plate 40, the metal mesh 42, and the filtration filter 16, to separate and remove relatively large solid contaminants. Further, in the vertical flow path 26, relatively small solid contaminants contained in the fluid are separated and removed by precipitation. Therefore, it is possible to reduce the content of solid contaminants in the liquid that has passed through the vertical flow path 26 to reach the connection port 17 and thus passed through the suction nozzle 10. In addition, because the nozzle body 12, the flow path member 14, and the filters are configured to be easily disassembled, it is easy to remove solid contaminants collected in the contaminant precipitation recess 28 of the flow path member 14 and to clean and replace the filters. It should be noted that although the suction nozzle 10 in this form uses the perforated metal plate 40, the metal mesh 42, and the filtration filter 16, these filters are not necessarily needed.

The use of the suction nozzle 10 enables removal of solid contaminants from a fluid, as has been stated above. Therefore, it is possible to use as the suction pump 52 in the suction unit 50 a mechanical pump having a structure in which a movable part may be contacted with the fluid. Accordingly, in this form, a diaphragm pump is used as the suction pump 52. The use of such a mechanical suction pump allows the suction unit to be made very compact as compared to the use of an ejector pump, which has been used conventionally, and also enables the energy consumption to be reduced to a level of from a fraction to one-several tenths of the conventional level.

The fluid recovery apparatus 1 is operable not only as an apparatus for recovering cutting fluid containing metallic powder but also as an apparatus for recovering other fluids containing solid contaminants, such as detergent that has been used to clean component parts, or lubricating fluid that has been used in machinery.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A suction nozzle to be connected to a suction pump to suck a fluid while separating solid contaminants from the fluid, the suction nozzle comprising:
   a hollow nozzle body having a connection port configured to be fluidly connected to the suction pump;
   a suction opening configured to suck the fluid;
   a vertical flow path defined in the hollow nozzle body and configured to extend in a vertical direction when the suction nozzle is placed in a position to perform suction;
   a contaminant precipitation recess defined under the vertical flow path in alignment with a longitudinal axis of the vertical flow path, wherein the contaminant precipitation recess is opened upward to communicate with the vertical flow path; and
   at least one lateral flow path extending laterally from the vertical flow path at a position above the contaminant precipitation recess,
   wherein the fluid sucked from the suction opening is led to the vertical flow path through the at least one lateral flow path and flows upward through the vertical flow path to reach the connection port.

2. The suction nozzle of claim 1, wherein a cross section of the vertical flow path is greater than a cross section of the connection port.

3. The suction nozzle of claim 1, wherein a cross section of each lateral flow path of the at least one lateral flow path is greater than a cross section of the connection port.

4. The suction nozzle of claim 1 further comprising:
   a flow path member having the vertical flow path and the at least one lateral flow path, the flow path member being disposed in the hollow nozzle body in a state where the vertical flow path is fluidly connected to the connection port; and
   a filter disposed in the hollow nozzle body between the suction opening and the at least one lateral flow path in the flow path member, wherein the hollow nozzle body, the flow path member, and the filter are detachably attached to each other.

5. The suction nozzle of claim 4, wherein an annular space is formed between an inner peripheral surface of the hollow nozzle body and an outer peripheral surface of the flow path member, and the filter has an annular shape and is disposed in the annular space.

6. The suction nozzle of claim 5, wherein the filter has a lower surface facing the suction opening and a side surface extending upward from a peripheral edge of the lower surface, and the suction nozzle further comprises an annular gap between the side surface and the inner peripheral surface of the hollow nozzle body, the annular gap communicating with the suction opening.

7. The suction nozzle of claim 5 further comprising:
   a plate-shaped member detachably attached to a lower surface of the flow path member;
   the flow path member being detachably attached to the hollow nozzle body by threaded engagement; and
   the plate-shaped member retaining the filter in the hollow nozzle body by supporting the filter from below.

8. The suction nozzle of claim 7, wherein the plate-shaped member has a multiplicity of circular holes and is disposed to cover the suction opening, such that the fluid sucked from the suction opening passes through the circular holes before reaching the filter.

9. The suction nozzle of claim 1, wherein the at least one lateral flow path includes a plurality of the lateral flow paths, wherein the plurality of the lateral flow paths are spaced from one another in a circumferential direction of the vertical flow path, each lateral flow path of the plurality of the lateral flow paths extends radially with respect to the vertical flow path.

10. A fluid recovery apparatus comprising:
    a suction pump; and
    a suction nozzle connected to the suction pump to suck a fluid while separating solid contaminants from the fluid, the suction nozzle comprising:
    a hollow nozzle body having a connection port configured to be fluidly connected to the suction pump;
    a suction opening for sucking the fluid;
    a vertical flow path defined in the hollow nozzle body and configured to extend in a vertical direction when the suction nozzle is placed in a position to perform suction;
    a contaminant precipitation recess defined under the vertical flow path in alignment with a longitudinal axis of the vertical flow path, wherein the contaminant precipitation recess is opened upward to communicate with the vertical flow path; and
    at least one lateral flow path extending laterally from the vertical flow path at a position above the contaminant precipitation recess,
    wherein the fluid sucked from the suction opening is led to the vertical flow path through the at least one lateral flow path and flows upward through the vertical flow path to reach the connection port.

11. The fluid recovery apparatus of claim 10, wherein a cross section of the vertical flow path is greater than a cross section of the connection port.

12. The fluid recovery apparatus of claim 10, wherein a cross section of each lateral flow path of the at least one lateral flow path is greater than a cross section of the connection port.

13. The fluid recovery apparatus of claim 10 further comprising:

a flow path member having the vertical flow path and the at least one lateral flow path, the flow path member being disposed in the hollow nozzle body in a state where the vertical flow path is fluidly connected to the connection port; and a filter disposed in the hollow nozzle body between the suction opening and the at least one lateral flow path in the flow path member, wherein the hollow nozzle body, the flow path member, and the filter are detachably attached to each other.

14. The fluid recovery apparatus of claim 13, wherein an annular space is formed between an inner peripheral surface of the hollow nozzle body and an outer peripheral surface of the flow path member, and the filter has an annular shape and is disposed in the annular space.

15. The fluid recovery apparatus of claim 14, wherein the filter has a lower surface facing the suction opening and a side surface extending upward from a peripheral edge of the lower surface, and the suction nozzle further comprises an annular gap between the side surface and the inner peripheral surface of the hollow nozzle body, the annular gap communicating with the suction opening.

16. The fluid recovery apparatus of claim 14 further comprising:
 a plate-shaped member detachably attached to a lower surface of the flow path member;
 the flow path member being detachably attached to the hollow nozzle body by threaded engagement; and
 the plate-shaped member retaining the filter in the hollow nozzle body by supporting the filter from below.

17. The fluid recovery apparatus of claim 16, wherein the plate-shaped member has a multiplicity of circular holes and is disposed to cover the suction opening, such that the fluid sucked from the suction opening passes through the circular holes before reaching the filter.

18. The fluid recovery apparatus of claim 10, wherein the at least one lateral flow path includes a plurality of the lateral flow paths, wherein the plurality of the lateral flow paths are spaced from one another in a circumferential direction of the vertical flow path, and each lateral flow path of the plurality of the lateral flow paths extends radially with respect to the vertical flow path.

* * * * *